United States Patent [19]

Day

[11] Patent Number: 5,762,306

[45] Date of Patent: Jun. 9, 1998

[54] SNAKE-LIKE TUBING SUPPORT FOR A COMPUTER TRACK BALL POINTING DEVICE

[75] Inventor: Paul Reuben Day, Rochester, Minn.

[73] Assignee: International Business Machines Corporation, Armonk, N.Y.

[21] Appl. No.: 675,125

[22] Filed: Jul. 3, 1996

[51] Int. Cl.$^6$ ................................................ G09G 5/08
[52] U.S. Cl. ................... 248/274.1; 248/918; 248/160; 345/157
[58] Field of Search ...................... 248/274.1, 918, 248/919, 920, 921, 118, 118.1, 118.3, 118.5, 205.2, 346.01, 160; 108/143, 138, 140, 65, 69, 152; 400/715; 345/156, 157, 167

[56] References Cited

U.S. PATENT DOCUMENTS

| | | | |
|---|---|---|---|
| 625,917 | 5/1899 | Arnold | 248/274.1 |
| 722,828 | 3/1903 | Fergusson | 248/274.1 X |
| 1,735,949 | 11/1929 | Brady | 248/160 |
| 2,510,198 | 6/1950 | Tesmer | 248/274.1 X |
| 2,710,051 | 6/1955 | Greenberg | 108/152 X |
| 4,417,710 | 11/1983 | Adair | 248/205.2 X |
| 4,842,174 | 6/1989 | Sheppard et al. | 248/160 X |
| 5,228,356 | 7/1993 | Chuang . | |
| 5,398,895 | 3/1995 | Whetherhult et al. . | |
| 5,416,479 | 5/1995 | Jondrow et al. . | |
| 5,419,613 | 5/1995 | Wedeking | 248/160 X |
| 5,428,355 | 6/1995 | Jondrow et al. . | |
| 5,464,214 | 11/1995 | Griffin . | |
| 5,473,345 | 12/1995 | Dorst . | |
| 5,593,128 | 1/1997 | Odom et al. | 248/918 X |

FOREIGN PATENT DOCUMENTS

| | | | |
|---|---|---|---|
| 54223 | 6/1911 | Switzerland | 248/274.1 |
| 524002 | 6/1940 | United Kingdom | 248/274.1 |

*Primary Examiner*—Robert W. Gibson, Jr.
*Assistant Examiner*—Stephen S. Wentsler
*Attorney, Agent, or Firm*—Andrew J. Dillon

[57] ABSTRACT

A pointing device support system is disclosed. The pointing device support system includes an infinitely adjustable pointing device support member having a clamp at one end for connecting the pointing device support system to a surface. A fingertip actuated pointing device, such as a trackball, is mounted to the other end of the support member. The support member is typically comprised of a snake-like tubing that can be conformed to and retain any number of positions to provide infinite adjustability. A pointing device support adapter is also provided adjacent the clamp. The support adapter is substantially parallel with the clamping surface and extends a length sufficient enough to provide the cable of the fingertip actuated pointing device with a section of protection.

4 Claims, 4 Drawing Sheets

SNAKE-LIKE TUBING SUPPORT FOR A COMPUTER TRACK BALL POINTING DEVICE

CROSS-REFERENCE TO RELATED APPLICATIONS

The present application contains subject matters related to co-pending application Ser. No. 08/675124, entitled INFINITELY ADJUSTABLE KEYBOARD SHELF, Attorney Docket No. R09-96-027, filed on even date herewith and assigned to the assignee hereof and incorporated by reference herein.

BACKGROUND OF THE INVENTION

1. Technical Field

The present invention relates generally to data processing systems and, more particularly, to computer data processing systems having manual input means. More specifically still, the present invention relates to a system for supporting and adjusting a pointing device, such as a mouse, in a variety of degrees and motions for optimal positioning by the user for utilization.

2. Description of Related Art

Data processing systems and data entry systems are well known to those skilled in the art. They have a long tradition evolving from manual typewriters to sophisticated computer systems that have either speech or penbased data entry devices. The main form of data entry to this day still is by keyboard or a pointing device, such as a mouse or trackball, or both.

The keyboard itself has evolved from the early typewriters to today's modern keyboard used with most computer systems. Along the way, the keyboard has been modified so as to optimize key position by placing the keys in such a way that the user may maximize data processing throughput as well as have comfort and ease of use. Unfortunately, the problems associated with the keyboard, as well as a mouse, are well known and include repetitive stress injury and carpal tunnel syndrome. The repetitive stress injuries typically are caused by placing the keyboard or pointing device in such a manner that is uncomfortable to the user, but is efficient for manufacturing purposes of the keyboard as well as for placement of the keyboard or mouse in the office environment.

Solutions have been proposed to minimize the effect of carpal tunnel syndrome as well as the repetitive stress injuries that occur, but these solutions have met with limited success or are complex and complicated in implementation.

For example, one design is to split the keyboard down the natural center of the left-hand and right-hand key sides and then angle each side in a position so as to provide a more comfortable or natural alignment to the wrist and fingers. Unfortunately, splitting the keyboard does not provide for proper placement of the keyboard at the height and distance to the user to optimize the functionality of the split system. Accordingly, other solutions have been proposed that include adjustable keyboard shelves that slide in and out in a horizontal direction to provide ease of access to the user as well as some that are adjustable up and down in such a manner so as to provide a comfort level for the user's arms and wrists.

Another solution has been to provide a keyboard platform that is mounted on levers and arms that provide multiple degrees of freedom and motion but are complicated to manufacture as well as difficult to install. A hole in the desk typically must be made for the levers to be anchored and then the arms of the tray system can be unsightly and awkward in taking up valuable desk space.

Accordingly, what is needed is an improved adjustable pointing device shelf that overcomes the prior art problems of positioning the shelf as well as the manufacturing constraints of a new keyboard or of the complicated lever-arm assembly of prior keyboard tray systems that might be adapted as pointing device support trays.

SUMMARY OF THE INVENTION

It is one object of the present invention to relate generally to data processing systems.

It is another object of the present invention to relate to computer data processing systems having manual input means.

It is yet another object of the present invention to relate to a system for supporting and adjusting a pointing device, such as a mouse, in a variety of degrees and motions for optimal positioning by the user for utilization.

According to the present invention, a pointing device support system is disclosed. The pointing device support system includes a pointing device support platform, an infinitely adjustable pointing device support member connected to the platform, and a surface clamp, that connects the pointing device support member to a second surface. Another clamp may be used to couple the pointing device onto the pointing device support platform in case the pointing device may be a trackball. Typically, pointing devices include mouse devices, trackballs, digitizer tablets, and the like. The infinitely adjustable pointing device support member is typically comprised of a snake-like tubing that can be conformed to and retain any number of positions to provide infinite adjustability.

Additionally, a pointing device cable connector can be imbedded in the infinitely adjustable pointing device support member allowing the pointing device to connect to a computer system. Means for retaining the pointing device against a bottom surface of the support platform is included as well. Such means may include Velcro tabs or hooks about which the cable can be wound. Lastly, a pointing device support adapter is provided that receives the pointing device support member and extends a length sufficient enough to provide the cable with a section of protection and that is substantially parallel with the second surface to which the support member is attached.

In an alternative embodiment, an infinitely adjustable pointing device support member is included, and the pointing device support platform is eliminated. In its stead, a pointing device is mounted within the housing and attached to the infinitely adjustable pointing device member. A cable, connected to the pointing device further being connectable to the computer system, may be embedded in the support member, while a surface clamp is provided to connect the support member to a second surface. In this case, the pointing device is a mouse pointer that can be manipulated by the thumb or forefinger of the user.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects, and advantages thereof, will best be understood by reference to the following detailed description of an illustrative embodiment when read in conjunction with the accompanying drawings, wherein:

FIG. 5 illustrates a cutaway close-up view of the mouse pointer shown in FIG. 4.

DETAILED DESCRIPTION OF PREFERRED EMBODIMENT

Figure 1:
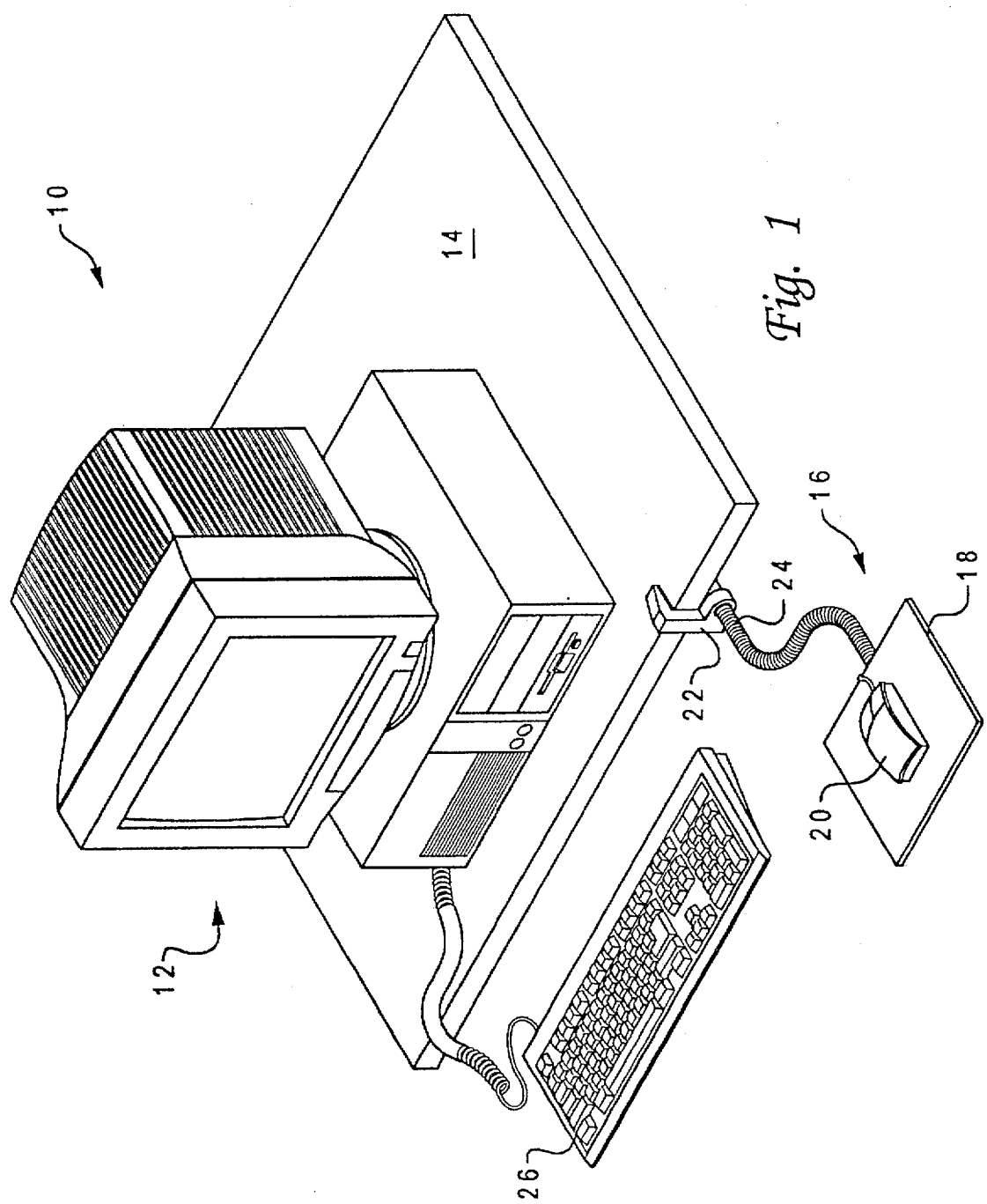
FIG. 1 includes a novel infinitely adjustable pointing device shelf.

A data processing system 10, which includes a novel infinitely adjustable pointing device shelf according to the present invention, is illustrated in FIG. 1. The data processing system 10 includes a computer system 12, a table or desktop surface 14, and an infinitely adjustable pointing device shelf 16. Computer system 12 typically includes a monitor for viewing data entered and retrieved as well as a processing unit for storing the data as well as processing the data. These systems are well known to those skilled in the art and their description need not be provided further at this time. Further included in the data processing system is a data entry means, such as a pointing device 20 shown in FIG. 1. Infinitely adjustable pointing device shelf 16 includes a pointing device platform 18, upon which a pointing device 20 is mounted. Pointing device 20 is tethered via a cable (not shown) connected to computer system 12. Further, pointing device platform 18 is mounted to table 14 via table clamp 22. Table clamp 22 connects to pointing device shelf platform support 24. Pointing device platform support 24 provides a channel in which the pointing device cable that connects to data processing system 10 is embedded. Pointing device shelf 16 is shown in greater detail in FIG. 2. Typically, the pointing device is used in combination with keyboard 26, which may rest on a similar shelf as that described in U.S. Pat. application 08/675124.

Figure 2:
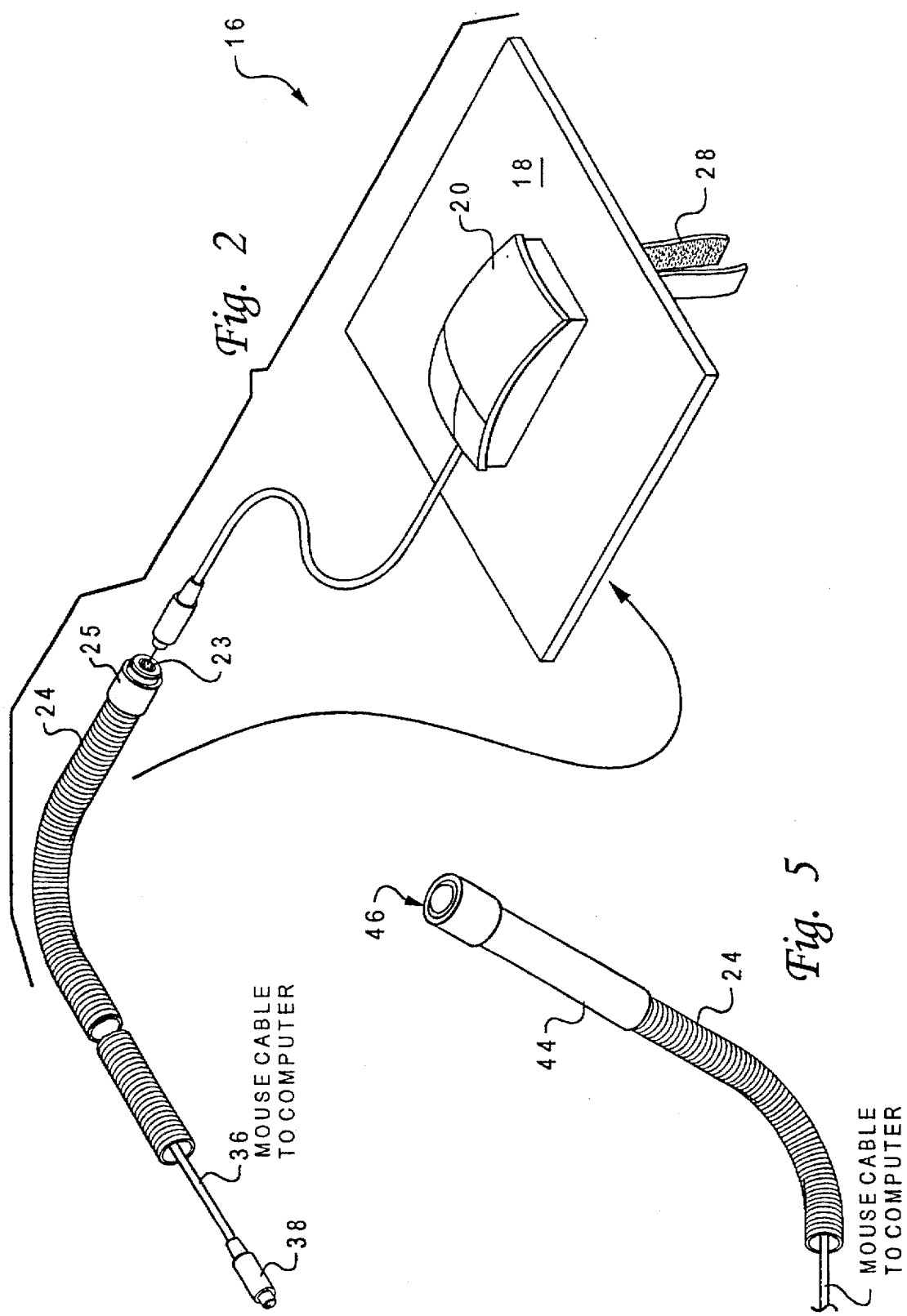
FIG. 2 depicts a partial cutaway view of an infinitely adjustable pointing device shelf.

FIG. 2 depicts a partial cutaway view of pointing device shelf 16. Pointing device shelf 16 includes pointing device platform 18, to which is attached pointing device platform support 24. Preferably, pointing device platform support 24 is made from a snake-like support tubing that, when kinked in particular directions, holds its new shape so as to provide great flexibility and infinite adjustability. Other types of pointing device support means will become readily apparent to those skilled in the art.

Pointing device cable 36 is imbedded within pointing device platform support 24 and is provided that is a connector with standard converters such as a converter 23 to attach any known pointing device at the terminating end 25 of the pointing device platform support 24. The pointing device cable connector 38 passes through pointing device platform support 24 for connection to the computer system. Means 28 are provided underneath pointing device platform 18 for securing any excess pointing device cable. One such device uses Velcro straps to hold the excess cable. Another device is two or three looping means around which the pointing device cable may be wrapped for taking up the slack. Other means for securing the excess pointing device cable will become apparent to those skilled in the art.

Figure 3:
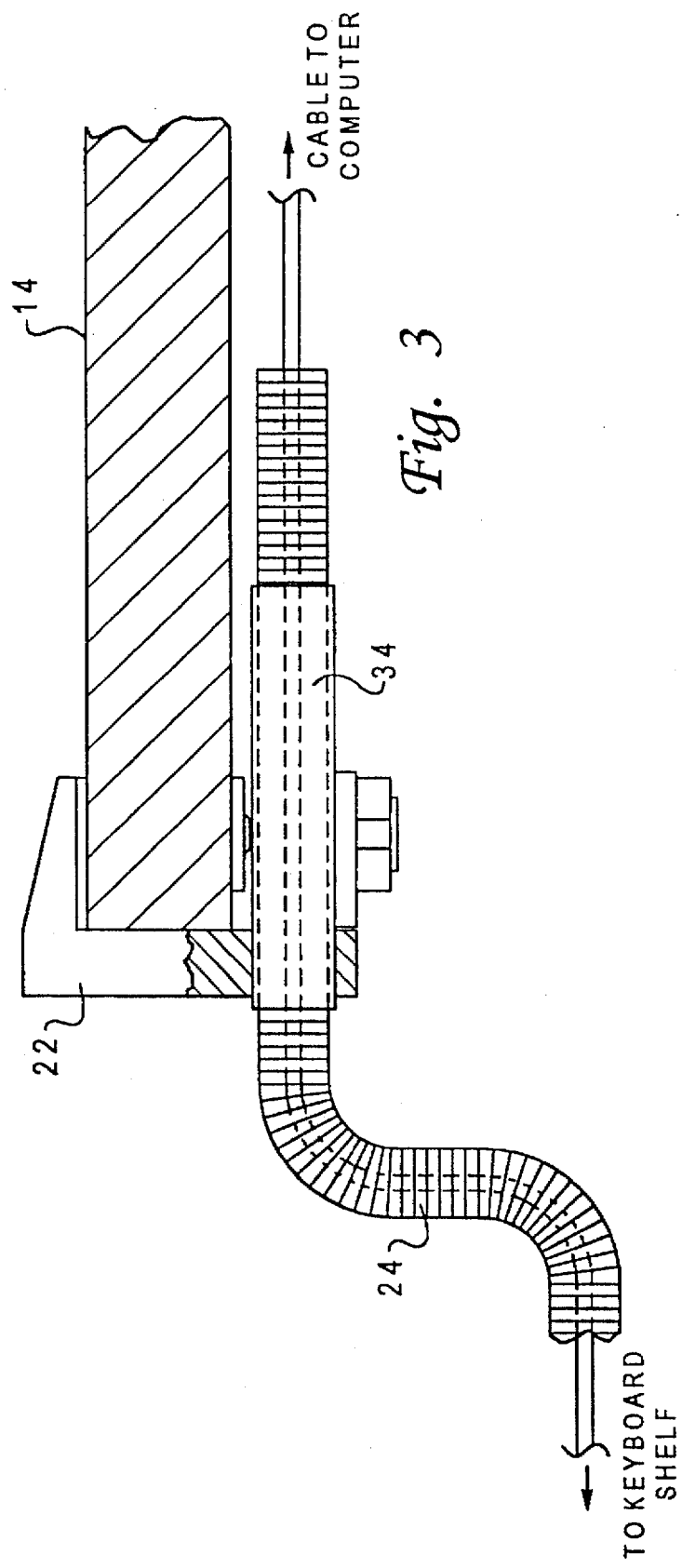
FIG. 3 depicts a cutaway side view of a table clamp as well as a pointing device platform support with the pointing device cable being passed to the computer.

FIG. 3 depicts a cutaway side view of a table clamp 22 as well as pointing device platform support 24 with the pointing device cable being passed to the computer. In this embodiment, a cylinder 34, typically metal or hard plastic, may be attached to table clamp 22 for protecting the cable and keeping it out of the user's way as the cable is fed to the computer. The diameter of the cylinder 34 is of such a size as to provide a snug fit of the pointing device platform support 24. Table clamp 22 has a padded bracket so as not to mar the table or desk.

Figure 4:
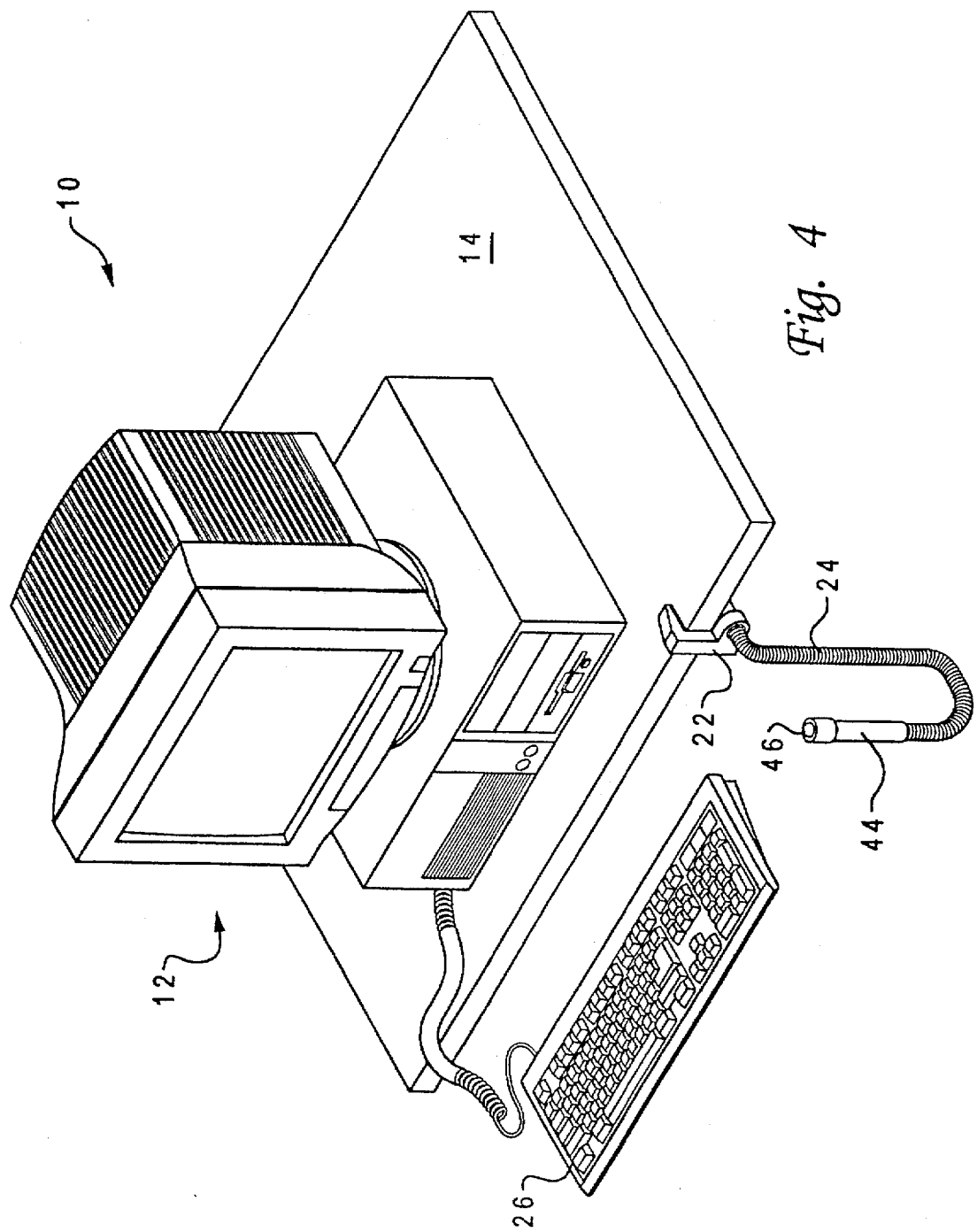
FIG. 4 illustrates an alternative embodiment for a mouse pointer used in an infinitely adjustable pointing device.

FIG. 4 illustrates an alternative embodiment for a mouse pointer used in infinitely adjustable pointing device 16. Instead of a pointing device platform, a mouse pointer housing 44 and mouse pointer 46 are substituted at the end of pointing device support 24. Mouse pointer 46 may be similar to that of the mouse pointer device manufactured by International Business Machines Corporation (IBM). FIG. 5 illustrates a cutaway close-up view of mouse pointer housing 44 and mouse pointer 46 shown in FIG. 4. Mouse pointer 46 as illustrated is either operated by the thumb or forefinger of the user. All other numerals used to identify elements in FIGS. 4 and 5 are consistent with those numerals assigned to elements previously defined in the specification.

The pointing device platform support offers many advantages over the prior art. One such advantage is that the pointing device support shelf is readily removable from the desk or table top and can be quickly mounted on another desk or table top. Further, the support tube used for holding the platform in an infinitely adjustable manner provides for a way to keep the pointing device cable or mouse cable out of the way of the user's feet. Yet another advantage is that the pointing device shelf can be moved up or down and left or right while keeping the pointing device support below the field of view of the user and out of interference with any items on the desk top that would otherwise be interfered with by an arm/lever-type pointing device support tray.

While the invention has been particularly shown and described with reference to a preferred embodiment, it will be understood by those skilled in the art that various changes in form and detail may be made therein without departing from the spirit and scope of the invention.

What is claimed is:

1. A pointing device support system comprising:

an infinitely adjustable elongate pointing device support member;

a cylindrical housing disposed at one end of said infinitely adjustable elongate pointing device support member;

a fingertip actuated pointing device mounted within said cylindrical housing;

a cable coupled to said fingertip actuated pointing device at one end of said cable and capable of being connected to a computer system at a second end of said cable; and a clamp connected to a second end of said infinitely adjustable elongate pointing device support member for attaching said infinitely adjustable elongate pointing device support member to a surface.

2. The pointing device support system according to claim 1, wherein said infinitely adjustable elongate pointing device support member is comprised of a snake-like tubing that can be conformed to and retained any number of positions.

3. The pointing device support system according to claim 2, wherein said cable is imbedded within said infinitely adjustable elongate pointing device support member.

4. The pointing device support system according to claim 2 wherein said clamp includes a cylindrical adapter suitable for receiving said snake-line tubing.

* * * * *

UNITED STATES PATENT AND TRADEMARK OFFICE
CERTIFICATE OF CORRECTION

PATENT NO.   :   5,762,306
DATED        :   June 09, 1998
INVENTOR(S)  :   Paul Reuben Day It is certified that error appears in the above-identified patent and that said Letters Patent is hereby corrected as shown below:

On the title page;
Item [54] Title, Line 2, "TRACK BALL" should be --TRACKBALL--.

Col. 1, Line 2, "TRACK BALL" should be --TRACKBALL--.

Signed and Sealed this

Seventeenth Day of November, 1998

Attest:

BRUCE LEHMAN

*Attesting Officer*    *Commissioner of Patents and Trademarks*